(12) United States Patent
Tomikawa et al.

(10) Patent No.: US 7,089,314 B2
(45) Date of Patent: Aug. 8, 2006

(54) CONSOLE INPUT/OUTPUT CONTROL SYSTEM AND CONSOLE CONTROL DEVICE

(75) Inventors: Miyuki Tomikawa, Yokohama (JP); Eiichiro Sakurai, Kahoku (JP); Tadashi Nakano, Kanazawa (JP); Jyunko Kunita, Ikekoma (JP); Rie Takeuchi, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 758 days.

(21) Appl. No.: 09/735,795

(22) Filed: Dec. 14, 2000

(65) Prior Publication Data
US 2001/0005856 A1 Jun. 28, 2001

(30) Foreign Application Priority Data
Dec. 14, 1999 (JP) .................................. 11-355186

(51) Int. Cl.
G06F 15/16 (2006.01)
(52) U.S. Cl. ............... 709/229; 709/208; 709/225; 709/226
(58) Field of Classification Search ............... 709/200, 709/203, 208–210, 217, 219, 220–225, 229, 709/226; 715/741, 751
See application file for complete search history.

(56) References Cited

U.S. PATENT DOCUMENTS

| | | | | | |
|---|---|---|---|---|---|
| 3,919,483 | A | * | 11/1975 | Gindi et al. ................ | 709/225 |
| 5,008,853 | A | * | 4/1991 | Bly et al. .................. | 715/751 |
| 5,295,081 | A | * | 3/1994 | Habra ......................... | 716/11 |
| 5,392,400 | A | * | 2/1995 | Berkowitz et al. .......... | 709/203 |
| 5,734,831 | A | * | 3/1998 | Sanders ....................... | 709/223 |
| 5,781,727 | A | * | 7/1998 | Carleton et al. ............ | 709/205 |
| 5,796,396 | A | * | 8/1998 | Rich .......................... | 715/741 |
| 6,128,016 | A | * | 10/2000 | Coelho et al. .............. | 709/223 |
| 6,131,116 | A | * | 10/2000 | Riggins et al. ............. | 709/219 |
| 6,170,017 | B1 | * | 1/2001 | Dias et al. .................. | 709/235 |
| 6,219,700 | B1 | * | 4/2001 | Chang et al. ............... | 709/222 |
| 6,463,460 | B1 | * | 10/2002 | Simonoff .................... | 709/203 |
| 6,549,934 | B1 | * | 4/2003 | Peterson et al. ............ | 709/203 |
| 6,567,849 | B1 | * | 5/2003 | Ludovici et al. ............ | 709/223 |
| 6,748,420 | B1 | * | 6/2004 | Quatrano et al. ........... | 709/205 |
| 6,802,053 | B1 | * | 10/2004 | Dye et al. .................... | 717/113 |
| 6,910,188 | B1 | * | 6/2005 | Keohane et al. ............. | 715/751 |

* cited by examiner

*Primary Examiner*—Ario Etienne
*Assistant Examiner*—Ramy Osman
(74) *Attorney, Agent, or Firm*—Staas & Halsey LLP

(57) ABSTRACT

A system to control a plurality of server computers as a group on a single client computer. An input/output (I/O) control system controls the command input/output from a plurality of consoles to a single server. The input/output control system controls the I/O status of the commands from each console to the server, and controls the I/O of commands from the various consoles based on the respective I/O statuses. A console display receives a message from a server and displays server console information in a manner identifiable from other server console information in response to the message received from the server.

5 Claims, 18 Drawing Sheets

| rw | r | r | r | ..... |
|---|---|---|---|---|
| − | PC a | PC b | PC c | |

| rw | r | r | r | ..... |
|---|---|---|---|---|
| PC c | PC a | PC b | − | |

| HOST NAME | MESSAGE |
|---|---|
| HOST A | abcdef |
|  | ijk |
|  | ... |
| HOST B | ijk |
|  | ... |
| HOST C | xyz |
|  | ... |
| ... | ... |

FIG. 19

| hWnd (HOST Z) | xyz |
|---|---|
| hWnd (HOST X) | stu |
| hWnd (HOST B) | abc |

CONSOLE INPUT/OUTPUT CONTROL SYSTEM AND CONSOLE CONTROL DEVICE

CROSS REFERENCE TO RELATED APPLICATIONS

This application is based upon and claims priority of Japanese Patent Application No. 11-355186, filed Dec. 14, 1999, the contents being incorporated herein by reference.

BACKGROUND OF THE INVENTION

1. Field of the Invention

The present invention relates to a device for integrated control of a plurality of server computer consoles on one, two or more client computers, and, more particularly, to an improved graphical user interface ("GUI") for controlling a plurality of server computer consoles as a group.

2. Description of the Related Art

Server computers require consoles, which are used for the server computer operating system (OS) installation, system maintenance, and system control. For example, UNIX hosts require consoles ("UNIX" is a registered trademark of Open, Ltd.). A user is able to operate the server computer by inputting commands using the console, and the console displays messages from the server.

Conventionally, a single console display device or personal computer that displays the console is required for a single server computer. The server computer console is displayed on the console display device or the personal computer display connected to the server computer with a one-to-one cable connection, such as a direct connection using a serial RS-232C cable. FIG. 1 illustrates an example of a conventional system of server computers 101A, 101B (UNIX hosts), which are respectively connected via connection cables 102 to consoles 103a, 103b (personal computers). As shown in FIG. 1, the respective UNIX hosts J 101A, 101B (where J=A, B, C, etc., and where capital letters are used to indicate server computers) are connected to personal computers PCk 103a, 103b (where k=a, b, c, etc., and where lower case letters are used to indicate client computers) using an RS-232C serial cable 102. The consoles for UNIX host A 101A and UNIX host B 101B are displayed on the displays of personal computers PCa 103a and PCb 103b, respectively.

FIG. 2 illustrates a conventional console 200 for UNIX host A 101A displayed on the display of personal computer PCa 103a. As shown in FIG. 2, "% %" is a command prompt, and following the command prompt "% %" are messages from UNIX host A or commands input into the UNIX host.

Conventionally, it has not been possible to control a plurality of UNIX host consoles as a group on two or more client computers. More specifically, it has not been possible to control UNIX host consoles as a group on more than one client computer because commands input simultaneously to the same server computer from a plurality of client computers cause command collisions to occur because the console performs the input/output (I/O) for the server computer.

SUMMARY OF THE INVENTION

The present invention provides a system to control the console of a single server computer on a plurality of client computers.

The present invention provides a graphical user interface for controlling a plurality of server computers as a group on a single client computer.

In accordance with the present invention, an input/output control system controls the input and output of commands from a plurality of consoles to a server, the input/output control system comprising an input/output status controller controlling the input/output status of commands from respective consoles to the server; and an input/output controller controlling the input of commands to and the output of commands from respective consoles based on the input/output status.

The input/output control system further comprises a display displaying console information identifying whether respective consoles have input/output privileges based on whether command input privileges are set for respective consoles.

The input/output controller sets a type of input/output control based on the input/output status of a command received from the respective consoles.

In accordance with the present invention, a console control system controls a plurality of server consoles as a group, the console control system comprising a receiving device receiving messages transmitted from the plurality of servers; and a display receiving a message from a server and displaying server console information in a manner identifiable from other server console information in response to the message received from the server.

The console control system display displays the information for the server that transmitted the message in a manner identifiable from the other server information in a server list listing names of the servers.

The console control system display displays the server console that received the message in a manner identifiable from the other server consoles.

The console control system display generates a menu displaying the server console that received the message.

The console control system further comprises a storage device storing the messages transmitted from the plurality of servers, wherein the display controls the identifiable displays for respective server consoles in response to receiving a message from a server.

The present invention is related to a computer-readable storage medium storing a program for implementing with a computer a method of controlling command input/output from a plurality of consoles to a server, the method comprising receiving commands input from the plurality of consoles; updating an input status of the server in response to a first command received from a first console; and controlling the input status of the server to exclude input of other commands to the server while in the updated input status.

The present invention is related to a computer-readable recording medium on which is recorded a program for implementing with a computer a method of integrating and controlling a plurality of server consoles, the method comprising receiving messages sent from a plurality of servers; controlling display of server console information for a particular server in a manner identifiable from other server console information in response to a message received from the particular server.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 19 illustrates an example of a table for controlling messages for the various server computers in accordance with embodiments of the present invention.

FIG. 20 illustrates an access menu data structure in accordance with embodiments of the present invention.

DESCRIPTION OF THE PREFERRED EMBODIMENTS

Figure 1:
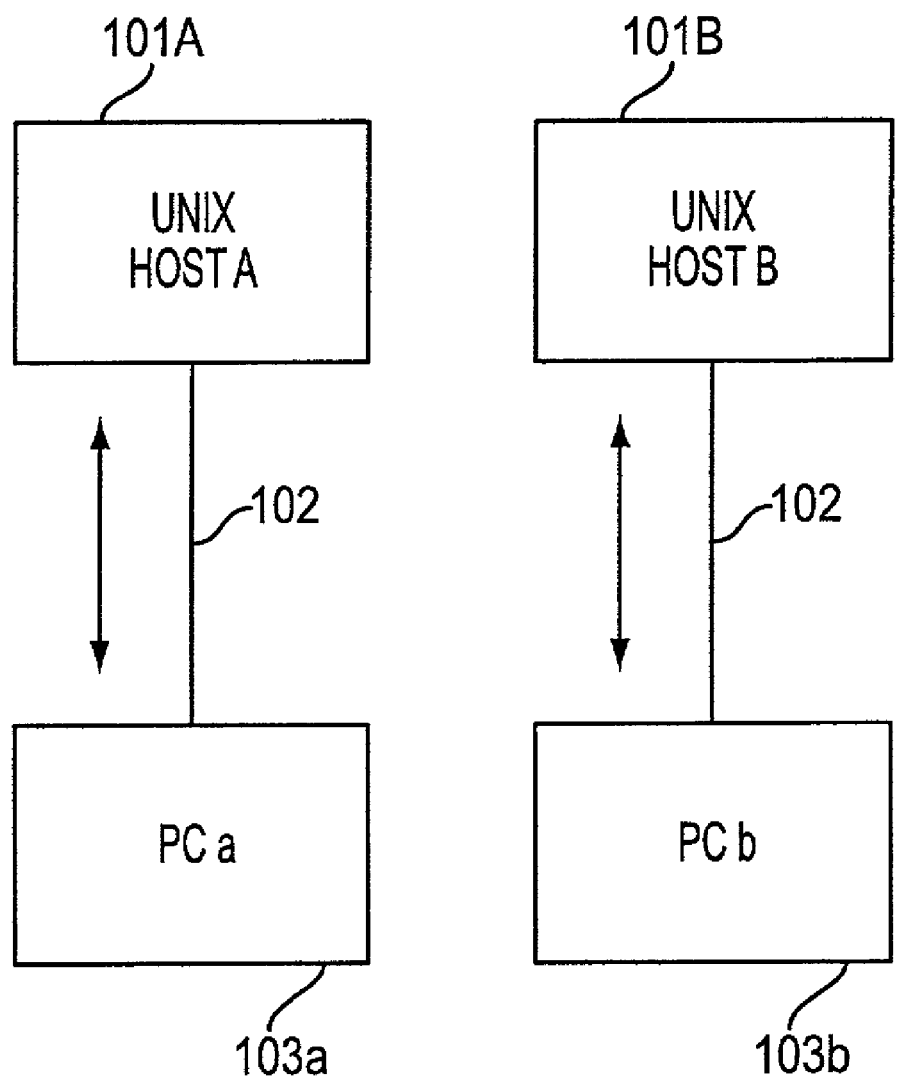
FIG. 1 is a block diagram of a conventional server computer/console relationship.
Figure 2:
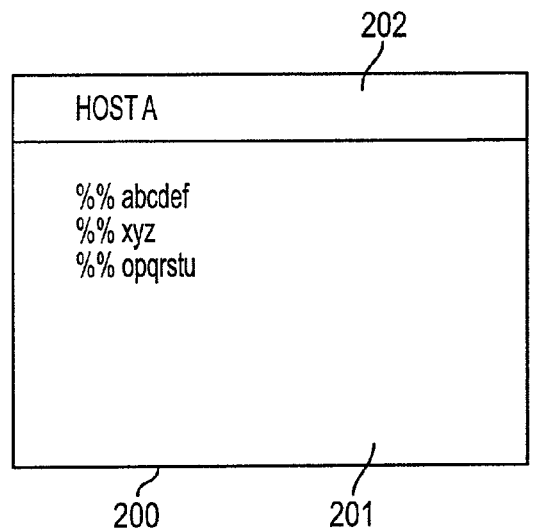
FIG. 2 illustrates a conventional console display on a client computer.

Reference will now be made in detail to the preferred embodiments of the present invention, examples of which are illustrated in the accompanying drawings, wherein like reference numerals refer to like elements throughout.

Figure 3:
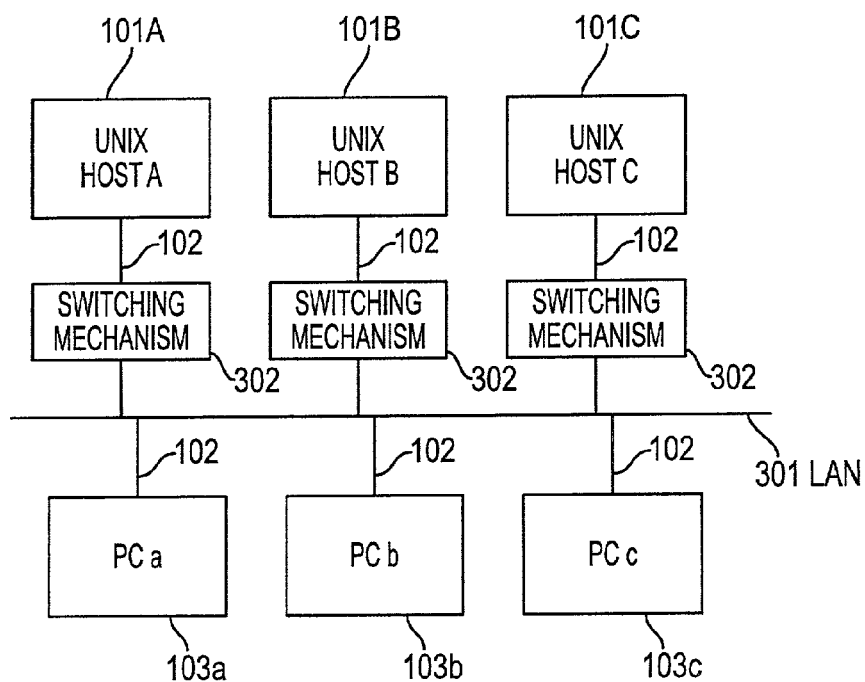
FIG. 3 is a block diagram of a server computer/console system configuration in accordance with embodiments of the present invention.

FIG. 3 is a block diagram of a server computer/console system in accordance with embodiments of the present invention. As shown in FIG. 3, UNIX hosts J 101A, 101B, 101C are connected to a LAN circuit 301 through respective switching mechanisms 302. Personal computers 103a, 103b, 103c are also connected to the LAN 301.

Figures 4, 5A, 5B:
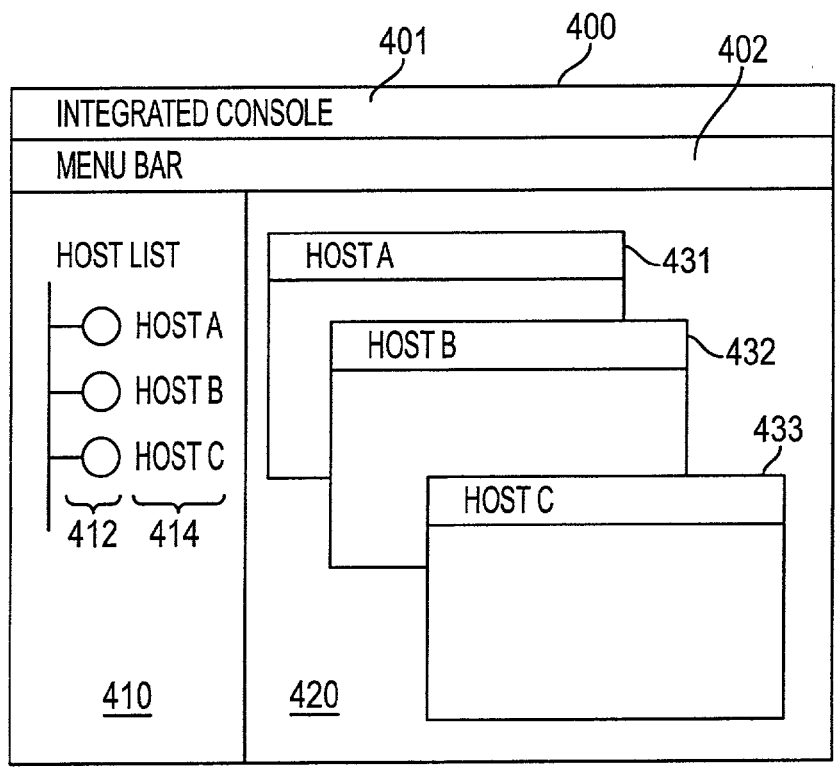
FIG. 4 illustrates an integrated console in accordance with embodiments of the present invention.
FIGS. 5A and 5B illustrate examples of a control table for controlling the command status of the server computer in accordance with embodiments of the present invention.

FIG. 4 illustrates an example of an integrated console 400 displayed on the display of personal computers 103a, 103b, 103c in accordance with the present invention. As shown in FIG. 4, a title window 401 and a menu bar window 402 are provided at the upper portion of the console 400. A display region 420 displays a plurality of server computer consoles 431, 432 and 433 that are connected, where each console includes a title bar and a console region. A display region 410 displays a list of server computer names (host names) 414 displayed in region 420, and icons 412 showing the status of the respective server computers.

By selecting a host name 414 or an icon 412 in region 410 using a mouse cursor (not shown), a user can place a corresponding console 431, 432, 433 into an active state, and can display the active console topmost on the screen in display region 420. In this manner, the user is able to input commands for the respective server computers 101A, 101B, 101C and to execute the commands on the server computers. However, as will be discussed in detail below, the user can input commands for the server computers and execute the commands on the server computers only when the user has read/write (rw) privileges for the applicable host.

In the description hereinbelow, an example is described wherein three consoles are displayed on the integrated console 400. However, the number of consoles displayed is not limited to three consoles, and various numbers of consoles can be displayed.

FIGS. 5A and 5B illustrate examples of control tables 104a, 104b for controlling the I/O relative to the hosts in accordance with embodiments of the present invention. Each of the switching mechanisms 302 shown in FIG. 3 includes a control table as shown in FIG. 5. In the tables shown in FIG. 5, "r" indicates that the personal computer is connected to the host via a read-only port (r port), while "rw" indicates that the personal computer is connected to the host via a read/write port (rw port).

When a personal computer and host are connected to the rw port, it is possible to input commands to the host from the console on the applicable personal computer, and possible to output messages to the console from the host. Alternatively, when the personal computer and host are connected to the r port, it is not possible to input commands from the console, although it is possible to output messages to the console from the host.

An important feature of the control table shown in FIGS. 5A and 5B is that rw privileges can be set for only a single personal computer for a single host at any given time; however, r privileges can be set for a plurality of personal computers for a single host.

Figure 6A:
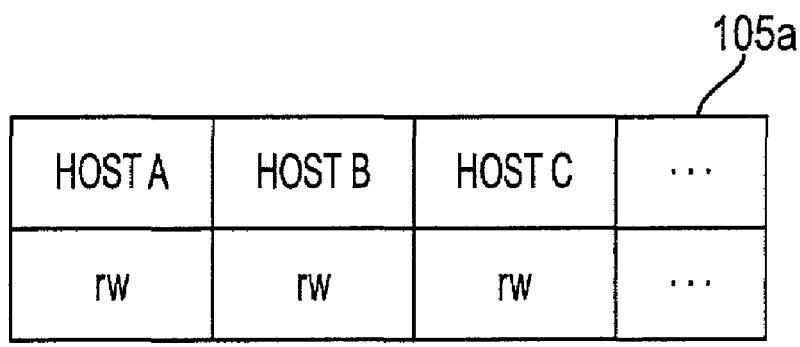
FIGS. 6A–6C illustrate examples of tables for controlling the input/output privileges for the respective server computers for the respective client computers in accordance with embodiments of the present invention.
Figure 6B:
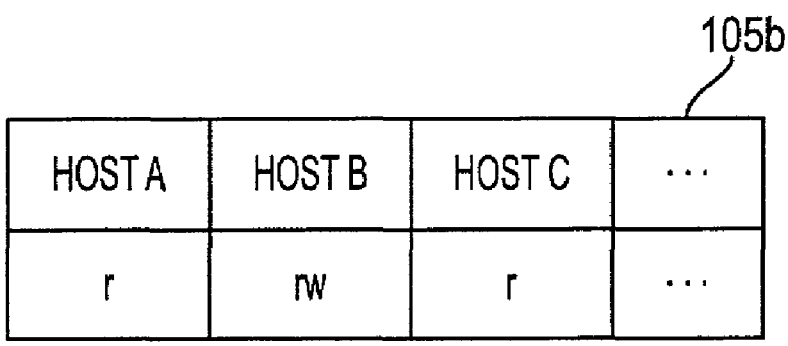
Figure 6C:
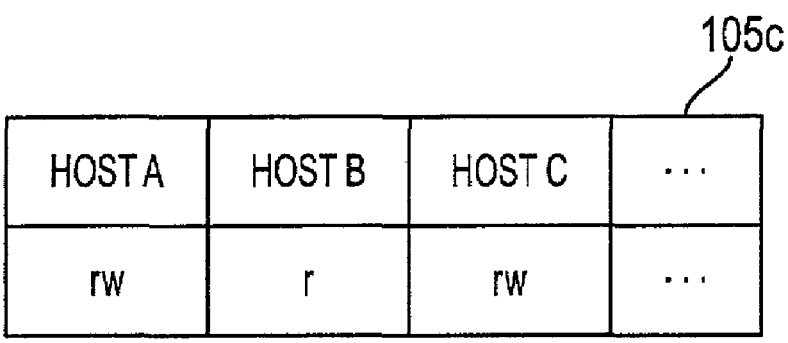

FIGS. 6A–6C illustrate examples of a privilege control table 105 for setting the I/O privileges for the various personal computers 103a–103c in accordance with the present invention. Each personal computer 103a, 103b, 103c shown in FIG. 3 includes a privilege control table 105. In the examples shown in FIGS. 6A–6C, the privilege control table 105 has the dual roles of specifying the hosts for connections and of controlling I/O privileges for the applicable hosts. Accordingly, a user is able to increase or decrease the number of consoles that are displayed on the integrated console 400 by adding or deleting host names in the privilege control table 105. Further, the privilege control table 105 can be separated into tables for each of these dual roles, and the control can be performed using two tables.

In FIGS. 6A–6C, rw indicates that a personal computer has read/write privileges with respect to the relevant host, while r indicates that the personal computer is read-only with respect to the host.

Figure 22:
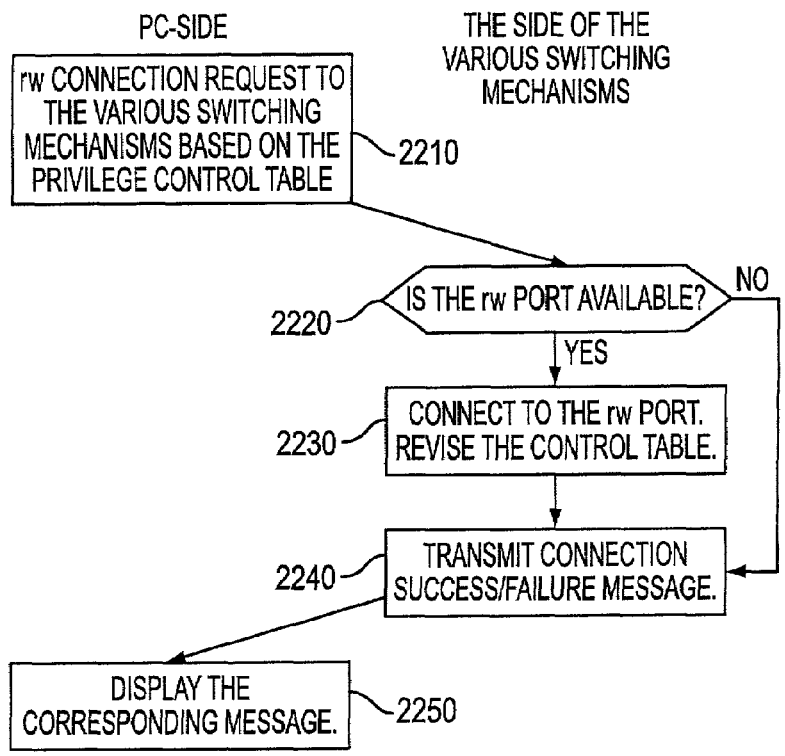
FIG. 22 is a flowchart illustrating the operation when the integrated console establishes a connection with the host in accordance with embodiments of the present invention.
Figure 23:
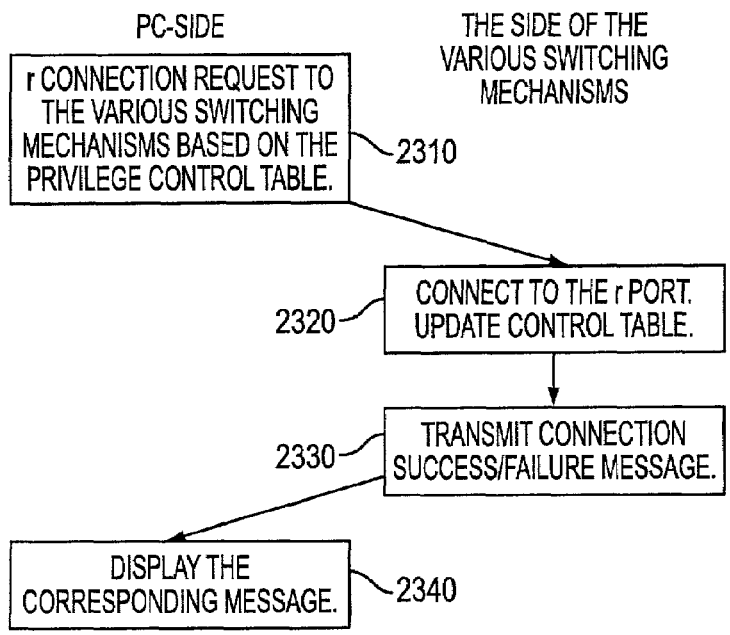
FIG. 23 is a flowchart illustrating the operation when the integrated console establishes a connection with the host in accordance with embodiments of the present invention.

FIGS. 22 and 23 are flow charts illustrating operational processes for establishing connections between the integrated console 400 of the personal computers 103a–103c and the hosts 101A, 101B, 101C in accordance with the present invention. More specifically, FIG. 22 is a flowchart illustrating an operational process for the integrated console 400 establishing connections to a host, wherein the rw privilege is set in the privilege control table 105. FIG. 23 is a flowchart illustrating an operational process for the integrated console 400 establishing a connection to a host, wherein the host is set to have an r connection in the privilege control table 105.

In the description below, it is assumed that, initially, none of the personal computers 103a, 103b, 103c are connected to any of the hosts 101A, 101B, 101C. Therefore, initially, no names of any personal computers are recorded in the r connection or rw connection columns of the switching mechanism control table 104 shown in FIG. 5. Furthermore, the description hereinbelow uses the example of the case where personal computer 103c (PCc) will establish connections to each of the hosts 101A, 101B, 101C.

Referring now to FIG. 22, initially, in operation 2210, the integrated console 400 sends an rw connection request signal to the various switching mechanisms 302 based on the privilege control table 105c (FIG. 6C) in the local personal computer 103c. In accordance with the example described herein, the integrated console 400 on personal computer 103c (PCc) references the privilege control table 105c and sends an rw connection request to the switching mechanisms 302 for hosts A and C. Note that the connection for host B 101B in the privilege control table 105c is an r connection. The operations performed with respect to the r connection request will be explained below with reference to FIG. 23.

Next, in operation 2220, the respective switching mechanisms 302 use the control table shown in FIG. 5 to determine whether or not the rw port is available. If the rw port is available, then the various switching mechanisms 302 continue processing in operation 2230. If the rw port is not available, then the operational process continues in operation 2240.

In the example described herein, the switching mechanisms 302 for hosts A and C reference the control table 104 shown in FIG. 5, and when the switching mechanisms 302 determine that the rw connection can be established, the operational process proceeds to operation 2230.

In operation 2230, the various switching mechanisms 302 connect the personal computer(s) that sent the connection request to the rw ports, and record this fact in the control table 104. In the example described herein, the switching mechanisms 302 for the hosts A and C connect with personal computer 103c (PCc) via rw connections, and record this fact in their own control tables 104.

In operation 2240, the respective switching mechanisms 302 send connection success/failure messages to the personal computer that issued the connection request. In the example described herein, the switching mechanisms 302 for hosts A and C send a message to the personal computer PCc indicating that the connections have been established. Alternatively, if the rw ports on hosts A and C are not available, for example, if they are already taken, then the respective switching mechanisms 302 send messages to the personal computer that requested the connection indicating that the connection(s) could not be established.

In operation 2250, the personal computer displays a message it has received. In the example described herein, the integrated console 400 of the personal computer PCc generates console windows 431 and 433 for hosts A and C, respectively, and displays the messages in the respective windows 431, 433. Alternatively, if messages are received indicating that the connections could not be established, then the integrated console 400 displays messages indicating that connections could not be established. When connections can not be established, the integrated console 400 does not generate console windows for the respective hosts A and C.

The operational process for the integrated console 400 establishing a connection to a host, wherein the host is set to have an r connection in the privilege control table 105 will now be described below with reference to FIG. 23.

In operation 2310, the integrated console 400 sends r connection request signals to the various switching mechanisms 302 based on the privilege control table 105 in the local personal computer. In the example described herein, the integrated console 400 of the personal computer PCc references its privilege control table 105c (FIG. 6C) and sends an r connection request signal to the switching mechanism 302 for the host B.

In operation 2320, the respective switching mechanisms 302 connect the applicable personal computer to the r port, and a notation indicating this connection is placed in the control table 104 shown in FIG. 5. In the example described herein, the personal computer PCc is connected to the r port of the switching mechanism 302 of the host B, and a notation to this end is placed in the control table 104. In contrast to the operational process shown in FIG. 22, the operational process shown in FIG. 23 does not include an operation corresponding to operation 2220. This is because the r connection can have multiple settings.

In operation 2330, the various switching mechanisms 302 transmit a connection success/failure message to the personal computer that sent the connection request. In the example described herein, the host B switching mechanism 302 sends a connection successful message to the personal computer 103c PCc.

In operation 2340, the integrated console 400 on personal computer 103c (PCc) creates the host B console window 432 and displays the message received in the window. In the above-described manner, a plurality of host console windows can be displayed together in the integrated console 400, as shown in FIG. 4.

In consideration of the security of the consoles, the r privilege and the rw privilege for each host is maintained statically. In other words, as shown in FIG. 5B, once the control table 104b included in a switching mechanism 302 establishes a connection between the personal computer PCc and the rw port, the personal computer PCc and the rw port remain connected until either the integrated console 400 is closed or the corresponding host console window is closed and an exit command is received from the appropriate console. Therefore, during the time that personal computer PCc and the rw port remain connected, the integrated consoles on other personal computers PCa, PCb cannot obtain rw privileges pertaining to the applicable host.

However, even if the host A rw port is connected with the personal computer 103c (PCc), specific actions can be taken by the other personal computers 103a, 103b to forcibly obtain the rw privilege for the host A.

When a command is entered through the host A console for which an rw connection has been established, the integrated console 400 sends the command to the specified host and outputs a message or the results of execution. If other personal computers are r connected to the applicable host, a message will be output to the applicable console windows. On the other hand, when a command is input using a console that has been r connected, the integrated console 400 does not transmit the command.

Moreover, the r privilege and rw privilege to the host can be changed dynamically. In particular, when the r privilege or rw privilege is changed dynamically, the control table that is established within the switching mechanism 302 can change each time a command is received from the various host consoles. The operations at this time will be explained below with reference to FIG. 5 through FIG. 8.

FIG. 5A illustrates a control table 104a that is established in the switching mechanism 302 for host A. In particular, FIG. 5A shows the status (r) by which messages are transmitted to personal computers PCa, PCb and PCc. In other words, FIG. 5A illustrates a status where commands cannot be entered from any of the consoles 431–433. In this status, if a command input using the host A console on personal computer PCc is received by the host A switching mechanism 302, the switching mechanism 302 would update the control table 104a from the status shown in FIG. 5A to the status of the control table 104b shown in FIG. 5B. The results of executing the command are received from host A and then, when the results are routed to the consoles on personal computers PCa, PCb and PCc, the switching mechanism 302 updates the control table 104b from the status shown in FIG. 5B to the control table 104a status shown in FIG. 5A. The switching mechanism 302 controls the connections based on the updated control table.

Even in the case of dynamically changing the r and rw privilege, there will be only one rw privilege in the control table 104 for each host at any given time, although there will be multiple r privileges, just as in the static case.

FIGS. 6A–6C illustrate examples of the privilege control table set for the various personal computer 103a–103c privileges in accordance with embodiments of the present invention. In accordance with embodiments of the present invention, it is possible to omit the privilege control table 105. However, the privilege control table 105 is preferable in order to protect the server computers 101A–101C from unnecessary command input by the users.

The user is able to increase or decrease the number of consoles displayed in the integrated console 400 by adding or deleting host names from the privilege control table 105. Each personal computer 103a, 103b, 103c in the system shown in FIG. 3 comprises a privilege control table 105.

FIG. 6A illustrates the privilege control table 105a for the personal computer 103a (PCa). According to the privilege control table 105a, the user of the personal computer PCa can receive messages from hosts A, B, and C on the respective consoles 431, 432, 433 of personal computer PCa, and has the privilege to execute commands entered for any of these hosts.

Similarly, FIG. 6B illustrates the privilege control table 105b for the personal computer PCb. According to the privilege control table 105b, the user of personal computer PCb can receive messages from host B and can execute commands on host B, but can only receive messages from hosts A or C, and cannot execute commands for hosts A or C.

Similarly, FIG. 6C illustrates the privilege control table 105c for personal computer PCc. According to the privilege control table 105c, the user of personal computer PCc can receive messages and perform commands for hosts A and C, but can only receive messages for host B, and cannot execute commands for host B.

Figure 7:
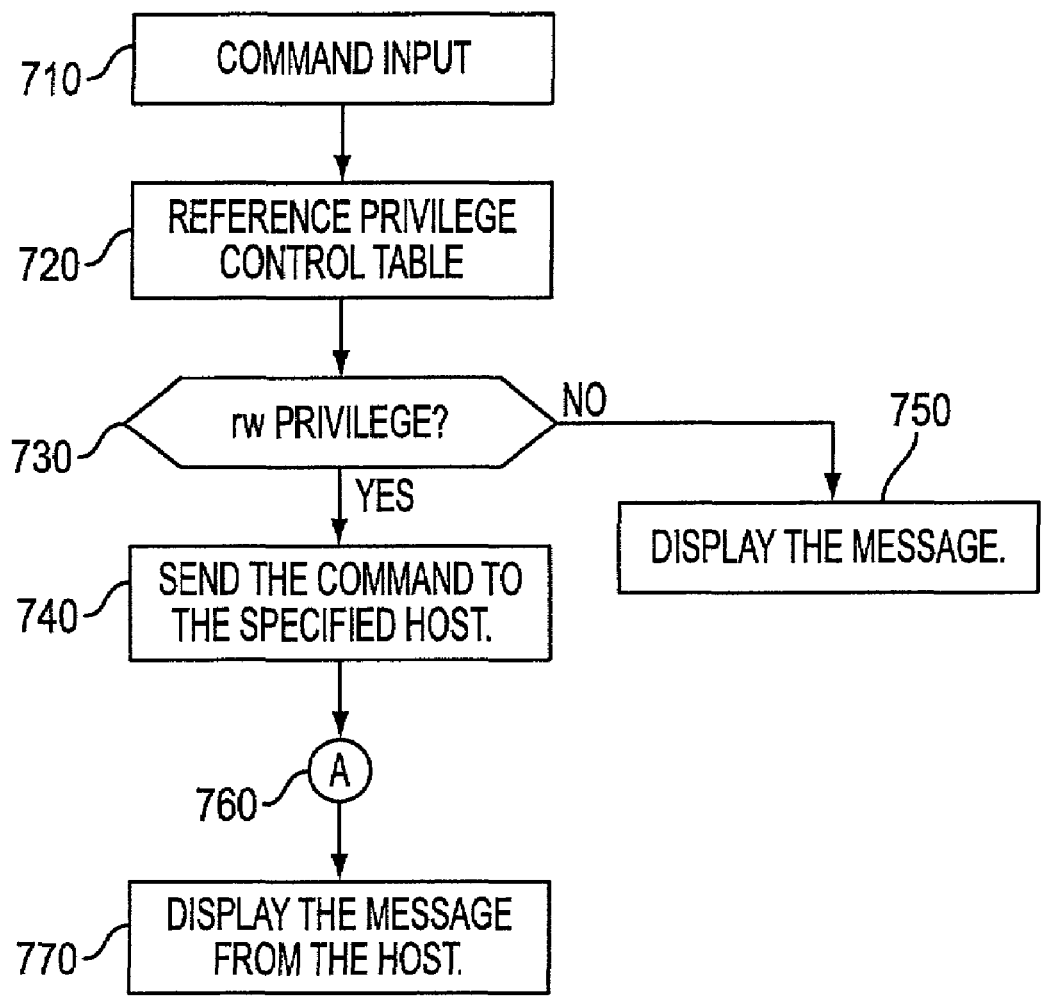
FIG. 7 is a flowchart illustrating an operational process of the client computer in accordance with embodiments of the present invention.
Figure 8:
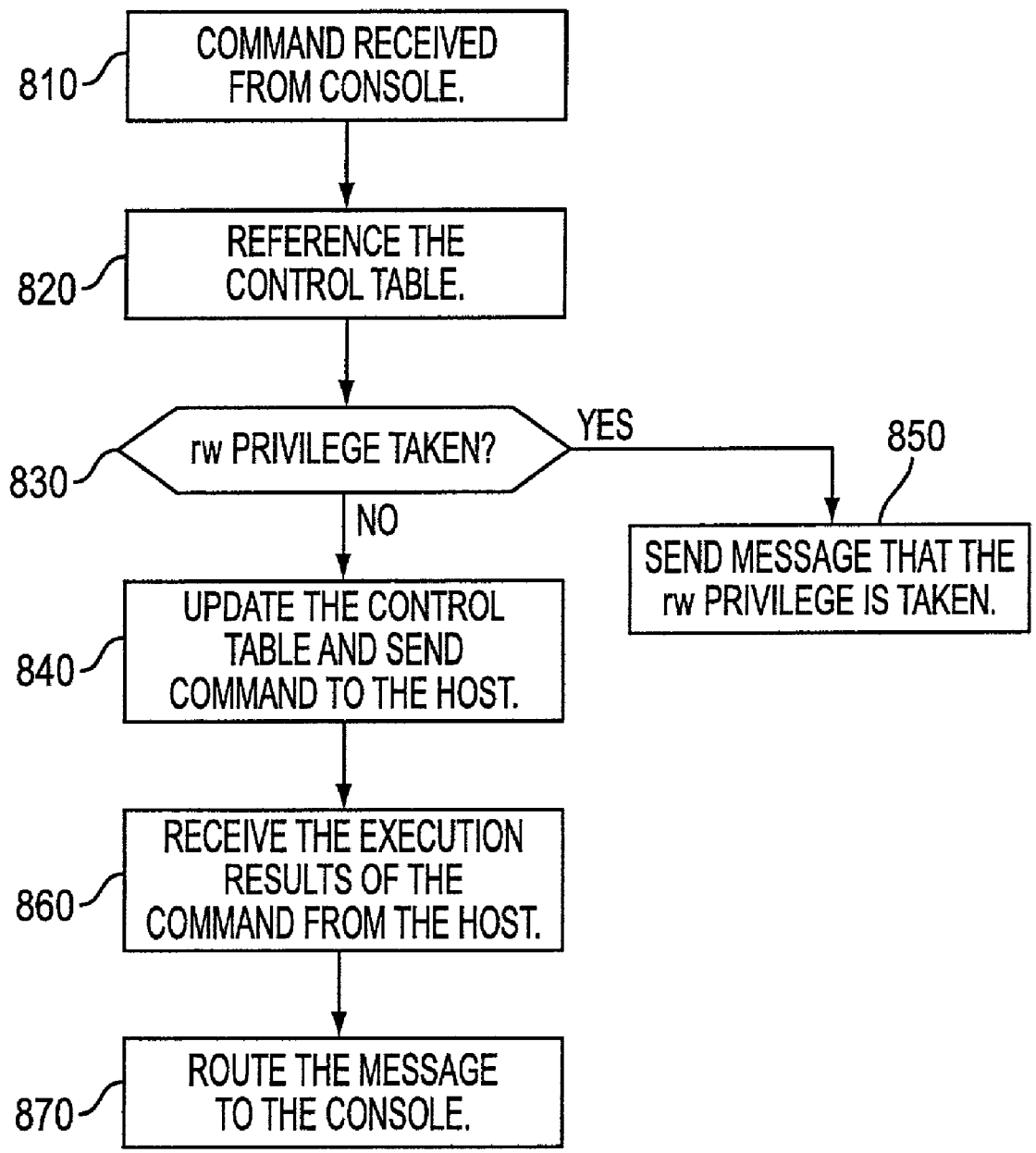
FIG. 8 is a flowchart illustrating an operational process of a switching mechanism in accordance with embodiments of the present invention.

FIGS. 7 and 8 are flowcharts illustrating operational processes for the integrated console 400 and the operations of the switching mechanism 302, respectively, in accordance with embodiments of the present invention. FIGS. 7 and 8 illustrate an example wherein the user of personal computer 103c (PCc) inputs commands from the host A console 431.

More specifically, FIG. 7 is a flowchart illustrating operation of the integrated console 400 when one of the consoles (431 through 433) on the personal computer PCc is used for inputting a command.

As shown in FIG. 7, in operation 710, one of the consoles in the integrated console 400 receives a command input by the user. In the example described herein, the console 431 (console for host A) on personal computer PCc receives a command input by the user. Next, in operation 720, the integrated console 400 references the privilege control table 105 (FIG. 6). In this example, the integrated console 400 references the privilege control table 105c shown in FIG. 6C.

In operation 730, the integrated console 400 uses the privilege control table 105c to determine whether or not there are rw privileges for the host. Specifically, the integrated console 400 references the privilege control table 105c to determine that the user of personal computer PCc has rw privileges for host A. The operational process then proceeds to operation 740. Alternatively, if the user of personal computer PCc inputs a command for host B, the integrated console 400 references the privilege control table 105c to determine that there are no rw privileges for host B, and the operational process proceeds to operation 750.

In operation 740, a command is sent from the integrated console 400 to the specified host. In the example described herein, the integrated console 400 sends the command that has been entered to the switching mechanism 302 for the host A.

In operation 750, a message indicating that the integrated console 400 does not have rw privileges is displayed on the display.

Operation 760 in FIG. 7 will be described hereinbelow with reference to FIG. 8.

Next, in operation 770, the integrated console 400 displays a message in the corresponding console when a result message is received from a host after the command is performed by the specified host. In accordance with the example described herein, if a message is received from a host, then the integrated console 400 displays the command execution results message on the console 431 for the host A. The same message will be displayed on console 431 of personal computers PCa and PCb.

FIG. 8 is a flowchart illustrating control operations of a switching mechanism 302 when a command input from a console is received by the switching mechanism 302 in accordance with embodiments of the present invention. The flowchart shown in FIG. 8 completes the operations of the system as a whole, picking up at operation 760 in FIG. 7.

Initially, in operation 810, the switching mechanism 302 receives a command input from one of the consoles. In the example described herein, the switching mechanism for host A receives the command that is input from console 431 of the personal computer 103c (PCc). In operation 820, the switching mechanism 302 references the control table 104 shown in FIG. 5.

In operation 830, the switching mechanism 302 uses the control table 104 to determine if any of the consoles (personal computers) have the exclusive rw privilege for host A. At this time, the control table is as shown in FIG. 5A. Therefore, the switching mechanism 302 for host A determines that none of the consoles (personal computers) occupy the rw privilege for host A, and the operational process proceeds to operation 840. Alternatively, if one of the consoles (personal computers) already occupies the rw privilege with respect to host A, then the switching mechanism 302 continues in operation 850.

In operation 840, the switching mechanism 302 updates the control table 104, connects the applicable host computer to the rw port, and sends the command to the applicable host. In the example described herein, the status of the control table 104a in the switching mechanism 302 for the host A is changed from the status shown in FIG. 5A to the status shown in FIG. 5B, and personal computer PCc and host A are rw connected. The switching mechanism 302 then sends commands to host A.

In operation 850, the switching mechanism 302 sends a message to the consoles corresponding to the various personal computers indicating that the rw privileges have been taken for the specified host. Specifically, the switching mechanism 302 sends a message to the respective consoles 431 for host A on personal computers PCa, PCb, PCc indicating that rw privileges have been taken for host A.

In operation 860, the switching mechanism 302 receives from the host the results of executing the command. At this time, the switching mechanism 302 updates the control table and the rw connection changes to an r connection. In the example described herein, the switching mechanism 302 for host A receives from host A a message pertaining to the results of executing the command. The switching mechanism 302 then updates the control table 104b from the status shown in FIG. 5B to the status shown in FIG. 5A, and changes the connection between the personal computer PCc and the host computer A from an rw connection to an r connection.

In operation 870, the switching mechanism 302 routes the message to the consoles corresponding to the various personal computers (the respective consoles 431 for personal computers PCa, PCb, and PCc).

Figure 9:
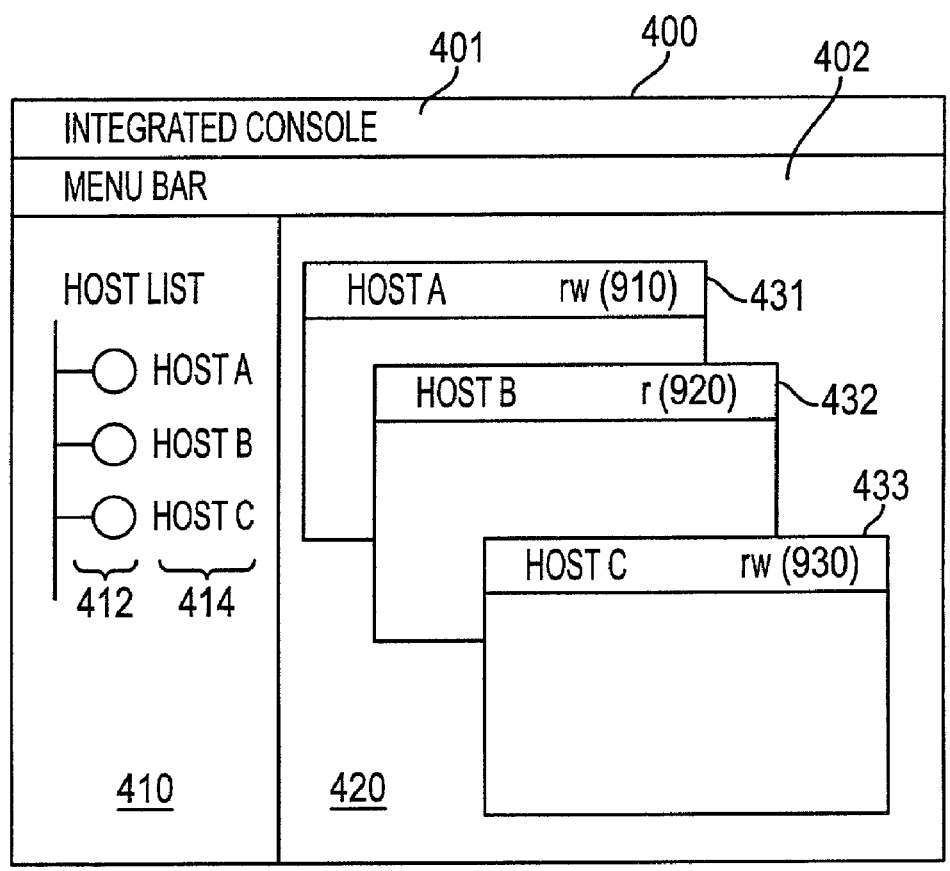
FIG. 9 illustrates a GUI that identifies the input/output privileges for each server computer in accordance with embodiments of the present invention.

FIG. 9 illustrates another example of an integrated console 400 on personal computer PCc in accordance with embodiments of the present invention. The integrated console shown in FIG. 9 differs from that shown in FIG. 4 in that the privileges of the respective consoles 431, 432, 433 are displayed in such a way that they can be identified. Specifically, indicators 910, 920, and 930 showing the privileges are displayed in the title bar of respective consoles 431, 432, 433. These indicators are displayed based on the privilege control table 105c shown in FIG. 6C. Note that the display shown in FIG. 9 can be applied either when the r privilege and rw privilege are supported statically, or when these privileges change dynamically.

The indicator rw indicates that there is the read privilege (r) for displaying messages sent from the host, and the write privilege (w) for inputting and executing commands in the host. In contrast, the indicator r indicates that although there is the read privilege for displaying messages sent from the host, the write privilege for inputting commands to the host does not exist.

The present invention is not limited to displaying privileges for the respective consoles in the above-described manner. For example, the privileges can also be identified by different colors in all or part of the console. In particular, the console(s) set to the r privilege only can be a certain color, while the console(s) set for rw privileges can be another color. Furthermore, the icons 412 in the host list 410, or the host names 414 can be displayed in an identifiable way.

Therefore, FIG. 9 shows that the user of the personal computer PCc is able to view messages from the hosts A and C and to input and execute commands for the hosts A and C, but, with respect to host B, the user is only able to view messages and is not able to input and execute commands for host B.

By identifying the privilege associated with respective consoles, the users are able to prevent the input of useless commands. In other words, with respect to the example shown in FIG. 9, the user of personal computer PCc can view the identification indicators (910, 920, and 930) and know in advance that he or she cannot input commands for host B (i.e., that the commands cannot be executed even if they are entered), and thus the user will not input useless commands.

Figure 10:
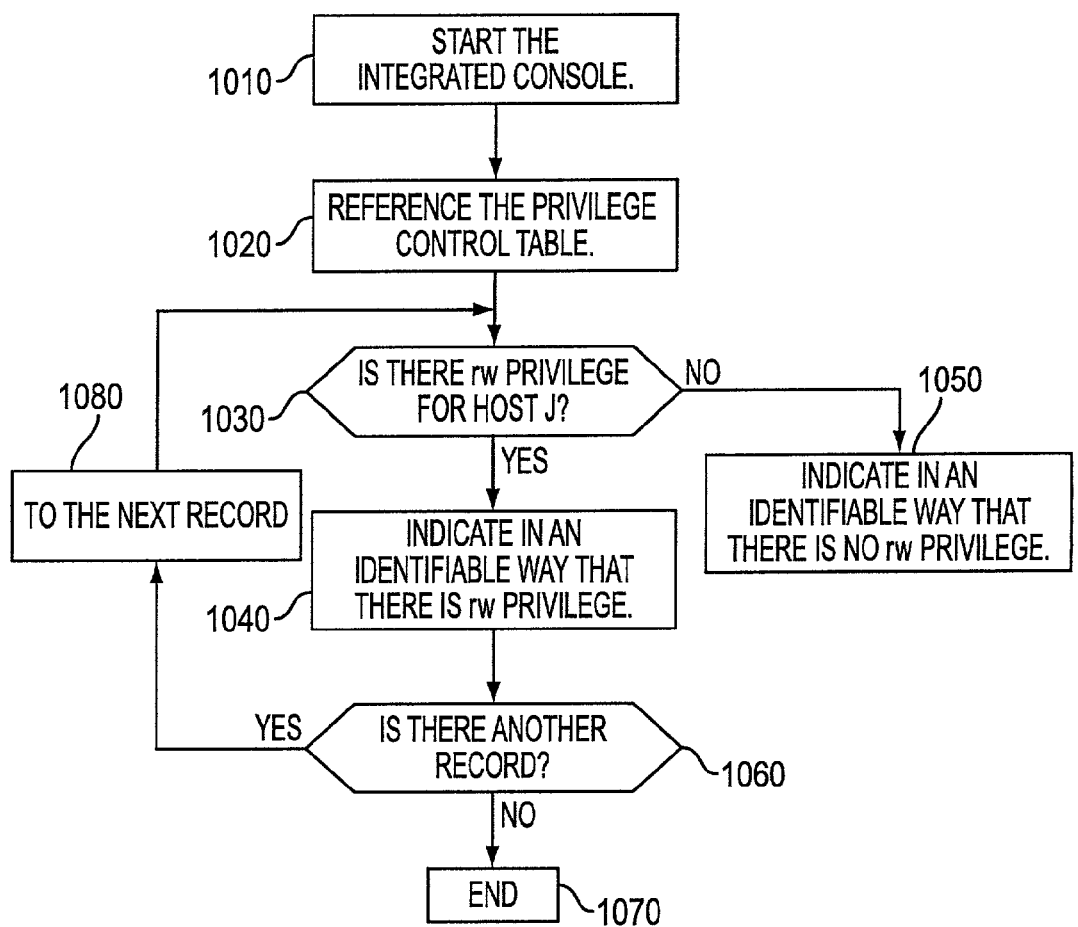
FIG. 10 is a flowchart illustrating an operational process for providing a console display identifying the input/output privileges in accordance with embodiments of the present invention.

FIG. 10 is a flowchart illustrating an operational process for providing an rw privilege identification display on the integrated console 400 in accordance with the present invention. The operational process shown in FIG. 10 will be described using the example of the operation of personal computer 103c PCc.

In operation 1010, the user starts the integrated console 400. Next, in operation 1020, the integrated console 400 references the privilege control table 105 shown in FIG. 6. In the example described herein, the integrated console 400 references the privilege control table 105c shown in FIG. 6C.

In operation 1030, the integrated console 400 determines whether or not the host J (where J is A, B, C, etc.) is set to rw privileges in the privilege control table 105 (FIG. 6). When it is determined that there are rw privileges for the host J, the integrated console 400 operational process proceeds to operation 1040, and when there are r privileges only, the operational process proceeds to operation 1050. In the example described herein, first the integrated console 400 references the privilege control table 105c in FIG. 6C and determines that there are rw privileges for host A (the first record). The operational process then proceeds to operation 1040.

In operation 1040, the integrated console 400 displays in an identifiable manner in region 420 that the host J console has rw privileges. In the example described herein, the integrated console 400 displays the host A console 431 (FIG. 9) in region 420, and displays indicator 931 (rw), indicating that there are rw privileges, in the title bar 402 of the console 431.

In operation 1050, when it is determined that the host does not have rw privileges, the integrated console 400 displays the host J console in region 420 in a manner in which it can be identified that there are no rw privileges.

In operation 1060, the integrated console 400 determines whether or not there is another record in the privilege control table 105c (FIG. 6). If there is another record in the privilege control table 105c, then the integrated console 400 returns to operation 1030, and if there are no more records, then the operational process is stopped (operation 1070). In the example described herein, the integrated console 400 finds the host B record, which is the next record in the privilege control table 105*c* (FIG. 6C) and the operational process returns to operation 1030.

In operation 1080, the integrated console 400 then reads the next record of the privilege control table 105 (FIG. 6). In the example described herein, the integrated console 400 reads the host B record, which is the next record in the privilege control table 105*c* (FIG. 6C).

In the above-described manner, the integrated console 400 shown in FIG. 9 generates a display for each console such that it possible to identify the privileges.

Figure 11:
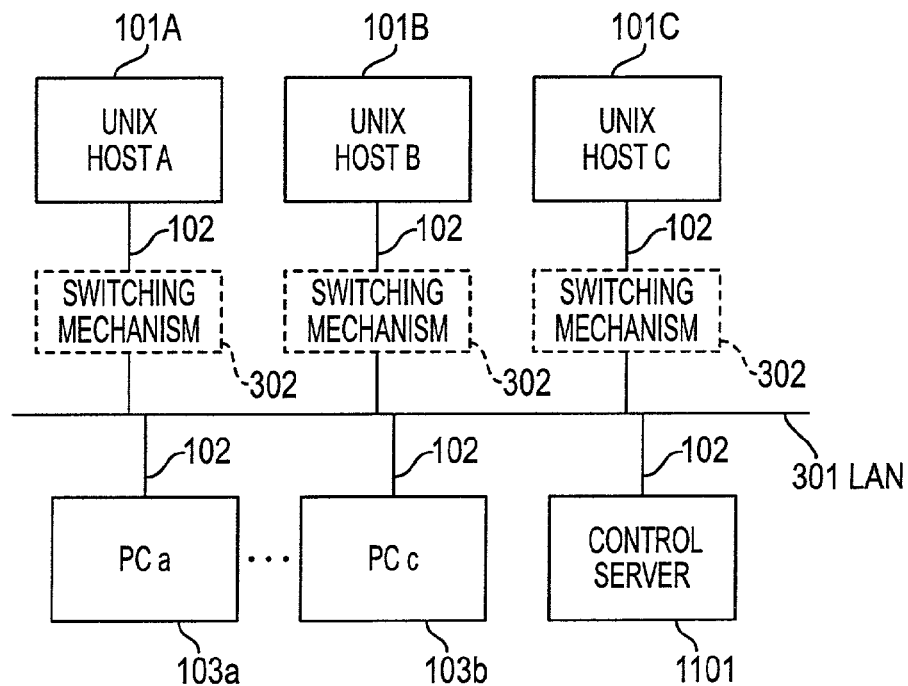
FIG. 11 is a block diagram of a server computer/console system in accordance with embodiments of the present invention.

FIG. 11 is a block diagram of a server computer/console system in accordance with second through fourth preferred embodiments of the present invention. The system shown in FIG. 11 differs from that shown in FIG. 3 that in the system shown in FIG. 11 comprises a control server 1101. Further, the system shown in FIG. 11 differs from that shown in FIG. 3 in that the various switching mechanisms 302, shown in dotted lines, can be omitted in the embodiments shown in FIG. 11.

In accordance with the embodiments shown in FIG. 11, the privilege control tables 105 can be omitted; however, the privilege control tables 105 are preferable because they protect the server computer from problematic commands input by the users.

In accordance with the second preferred embodiment shown in FIG. 11, the control server 1101 comprises the control table 104 (FIG. 5) and the privilege control table 105 (FIGS. 6A through 6C). In this case, the various switching mechanisms 302 can be omitted. In the second preferred embodiment, operations 720, 730, and 740 in FIG. 7, and all operations in FIG. 8 (810 through 870), are operations performed by the control server 1101.

In accordance with the third preferred embodiment, the control server 1101 includes the control table 104 (FIG. 5) and each of the personal computers 103*a*–103*b*, respectively, comprise the privilege control table 105 (FIG. 6). Therefore, the various switching mechanisms 302 can be omitted. Moreover, in accordance with the third preferred embodiment of the invention, all operations performed in the flowchart shown in FIG. 8 (operations 810 through 870) are performed by the control server 1101.

In accordance with the fourth preferred embodiment of the invention, the various switching mechanisms 302 comprise the control table 104 (FIG. 5), and the control server 1101 comprises the privilege control table 105 (FIG. 6). In accordance with the fourth preferred embodiment, the various switching mechanisms 302 cannot be omitted. Moreover, in accordance with the fourth preferred embodiment, operations 720, 730, and 740 in FIG. 7 are operations that are performed by the control server 1101.

FIGS. 12 through 17 illustrate examples of GUIs to display a received type of message, or to display a registered message (hereinafter referred to simply as "message"), in accordance with the present invention. Moreover, two or more of the GUIs shown in FIG. 12 through FIG. 17 can be combined. The GUIs shown in FIGS. 12–17 inform the user that some sort of message or registered message is displayed on the console, making it possible to reduce the monitoring effort by the user.

In the description of the GUIs shown in FIGS. 12-17, an example is provided wherein three consoles are displayed in the integrated console 400. However, it will be recognized by those skilled in the art that more than three consoles may be provided, and the level of convenience provided to the user by the GUIs increases with an increasing number of consoles.

Figure 12:
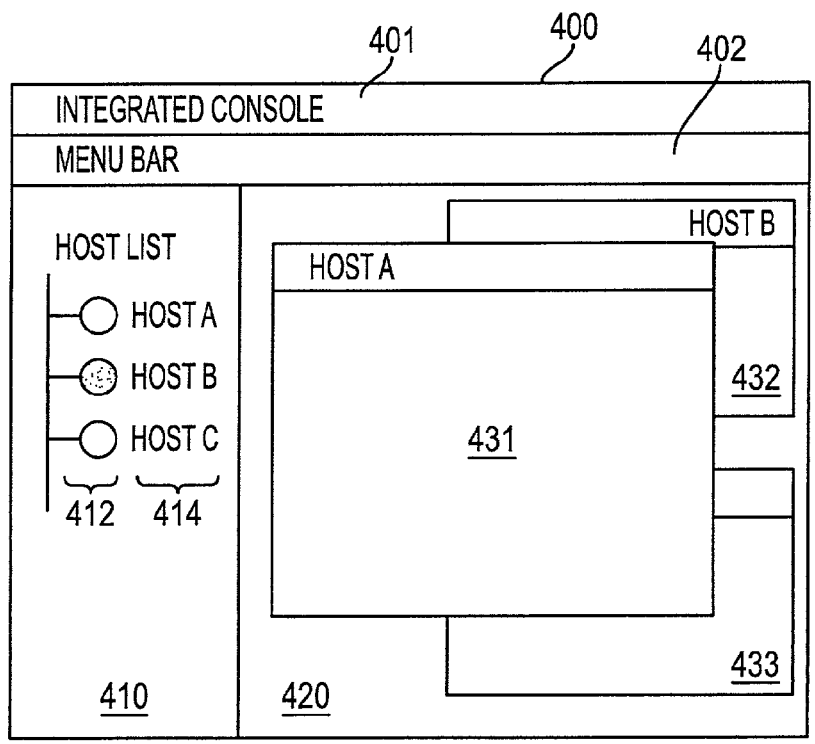
FIG. 12 illustrates an example of a GUI in accordance with embodiments of the present invention.

FIG. 12 illustrates a first example of a GUI in accordance with the present invention. As shown in FIG. 12, when a message is received from host B, the host B icon 412 in the host list is displayed in a manner that it can be seen that a message has been received. There is no change in the display of region 420 when the host B message is received. In accordance with the embodiment shown in FIG. 12, even if the console 431 of host A (or some host other than host B) is active and is the top-most display, only icon 412 is displayed so as to be identifiable. The user can select the host B host name from the host list 414 or the host B icon 412 (the icon 412 that is displayed so as to be identifiable) to activate and display the host B console 432 as the top-most display in region 420. If necessary, the user can input commands using the host B console after it is activated.

Figure 13A:
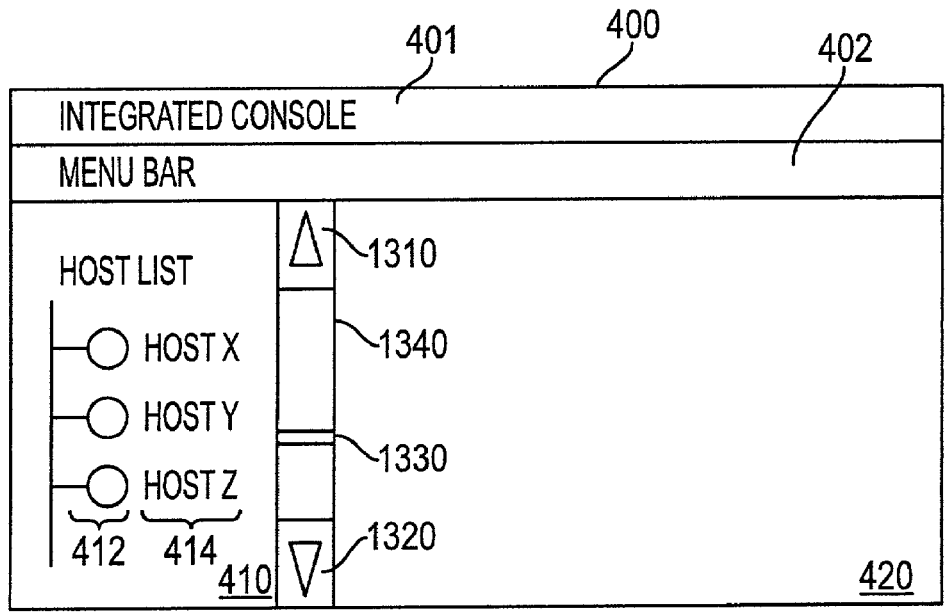
FIGS. 13A and 13B illustrate an example of a GUI in accordance with embodiments of the present invention.
Figure 13B:
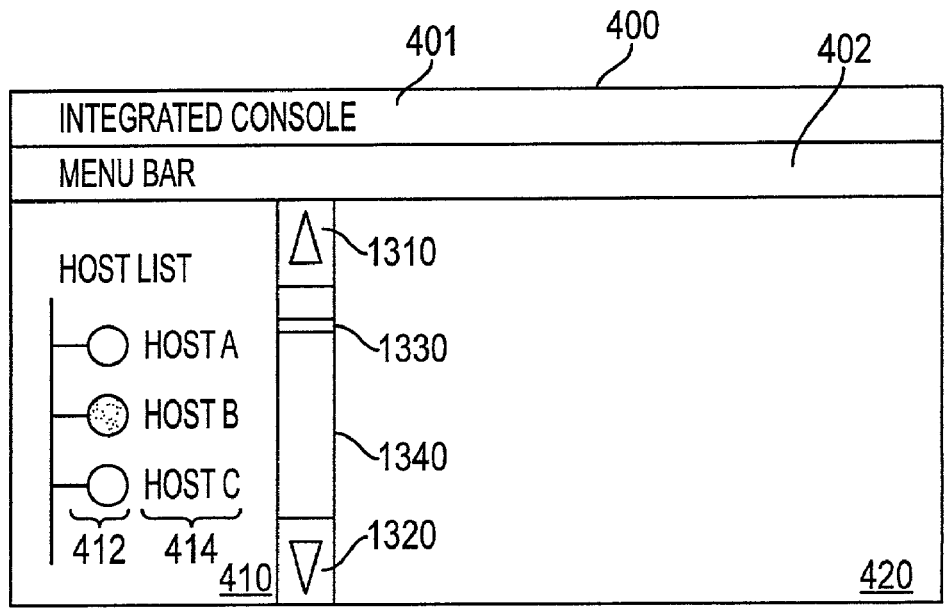

FIGS. 13A and 13B illustrate a second example of a GUI in accordance with the present invention. The GUI shown in FIG. 13 is particularly useful when many consoles are displayed. A scroll bar 1340 comprises an indicator 1330, an icon 1310 that moves the indicator 1330 in an upward direction, and an icon 1320 that moves the indicator 1330 in a downward direction. By dragging the indicator 1330 with the mouse, a user can change the host list display. The scroll bar type display is well-known in the software industry.

Before receiving a message from host B, the host list displays hosts other than host B, as shown in FIG. 13A. When a message is received from host B, the integrated console 400 changes the host list display to show host B, as shown in FIG. 13B. The user can activate the host B console in region 420 and display it as the top-most display through the operations described above. If necessary, the user can input commands from the host B console that has been activated. However, the user command input capability is limited to the times when there is an rw connection.

Note that, in accordance with the embodiment shown in FIG. 13, region 420 does not change when the message is received from host B. Because of this, the display of region 420 is omitted.

Figure 14:
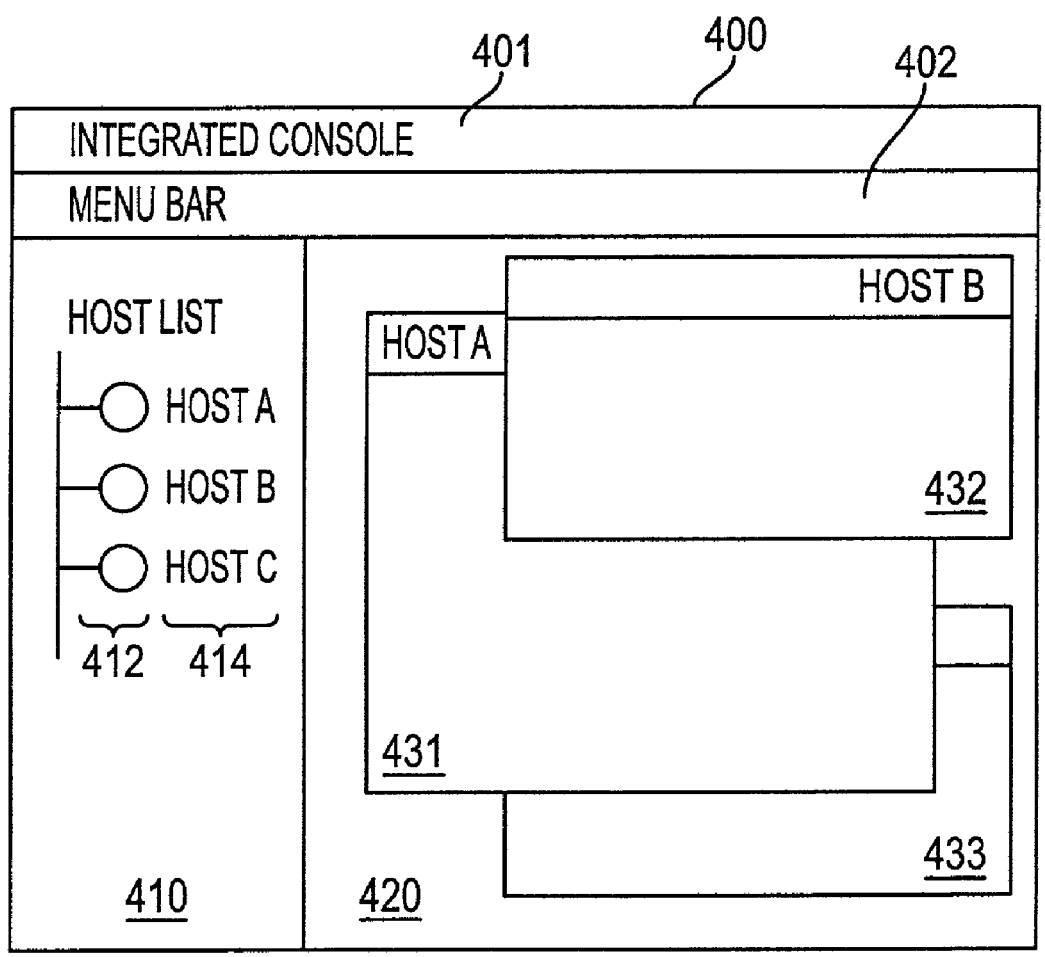
FIG. 14 illustrates an example of a GUI in accordance with embodiments of the present invention.

FIG. 14 illustrates a third example of a GUI in accordance with the present invention. In contrast to the embodiments shown in FIGS. 12 and 13, the host list does not change, but rather the display in region 420 is changed by the reception of the message from host B. The display shown in FIG. 14 is similar to that shown in FIG. 12 before the message is received. The display shown in FIG. 14 differs from that shown in FIG. 12 in that the host B icon 412 is not displayed in a manner that it can be identified from among the other host A and host C icons 412.

As shown in FIG. 14, when a message is received from host B, the integrated console 400 activates and displays the console for which the message was received (the host B console 432) as the top-most display. In accordance with the embodiment shown in FIG. 14, the integrated console 400 changes the order of display for the console windows for which messages have been received, and places the appropriate window as the top-most window.

In the above-described manner, the user is informed that a message or a registered message has been received from host B. Moreover, in accordance with the embodiment shown in FIG. 14, there is no need for an operation to activate the console, making operation of the console even more convenient for the user.

In accordance with the embodiment of the present invention shown in FIG. 14, only the console 432 for host B may be made active, in which case the title bar for the host B console is highlighted. Furthermore, the host B console 432 may be made the top-most display, in which case the host B console 432 is highlighted (where the host A console would remain highlighted).

Figure 15A:
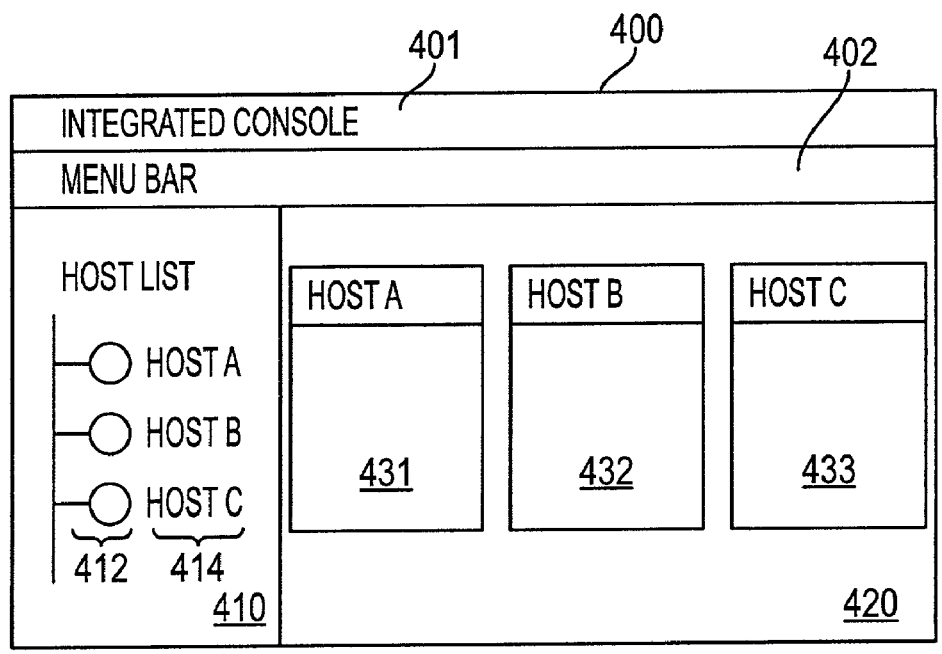
FIG. 15 illustrates an example of a GUI in accordance with embodiments of the present invention.
Figure 15B:
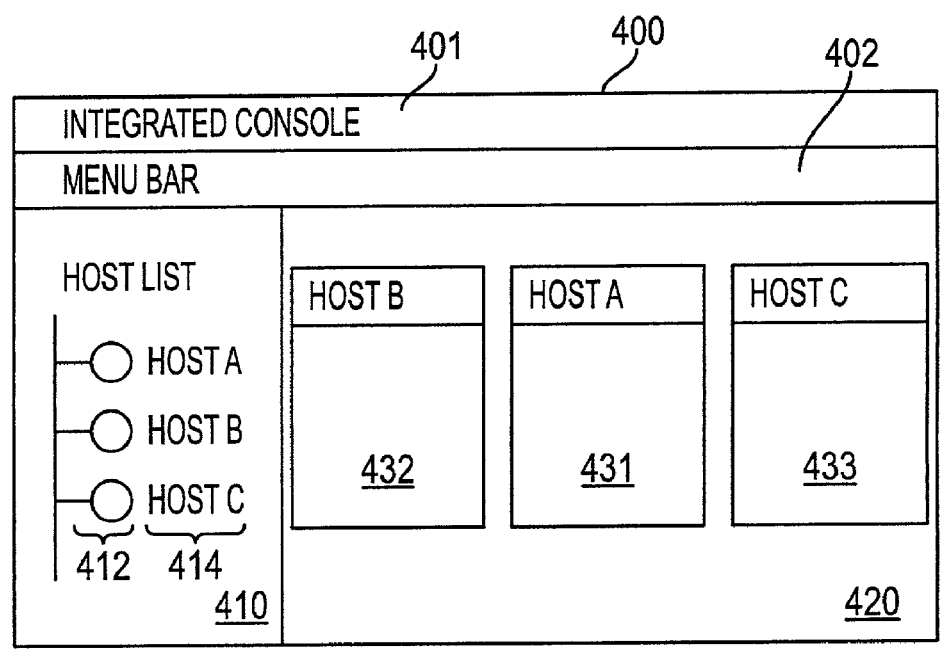

FIGS. 15A and 15B illustrate a fourth example of a GUI in accordance with the present invention. FIG. 15A illustrates a state of the integrated console 400 before a message is received from host B. In this state, the integrated console 400 displays the various consoles (431 through 433), lined up in a manner in which none of the consoles 431–433 overlap the other consoles.

FIG. 15B illustrates a state of the integrated console 400 after a message is received from the host B. As shown in FIG. 15B, the host B console 432 is controlled to be displayed on the far left-hand side. Alternatively, when multiple rows of consoles are displayed, then the host B console 432 is displayed as the upper left-most console. The display shown in FIG. 15 makes it possible for the user to know immediately that a message has been displayed on the host B console 432.

The display example shown in FIG. 15B is particularly useful in cultures where sentences are read from left to right. Alternatively, in cultures where information is read from right to left, the integrated console 400 can display the host console that has received a message at the right-most position or, at the upper right when multiple rows of consoles are displayed. Moreover, in those cultures wherein the center is the most noticeable, the integrated console 400 can display the host console that received a message in a central position.

Figure 16A:
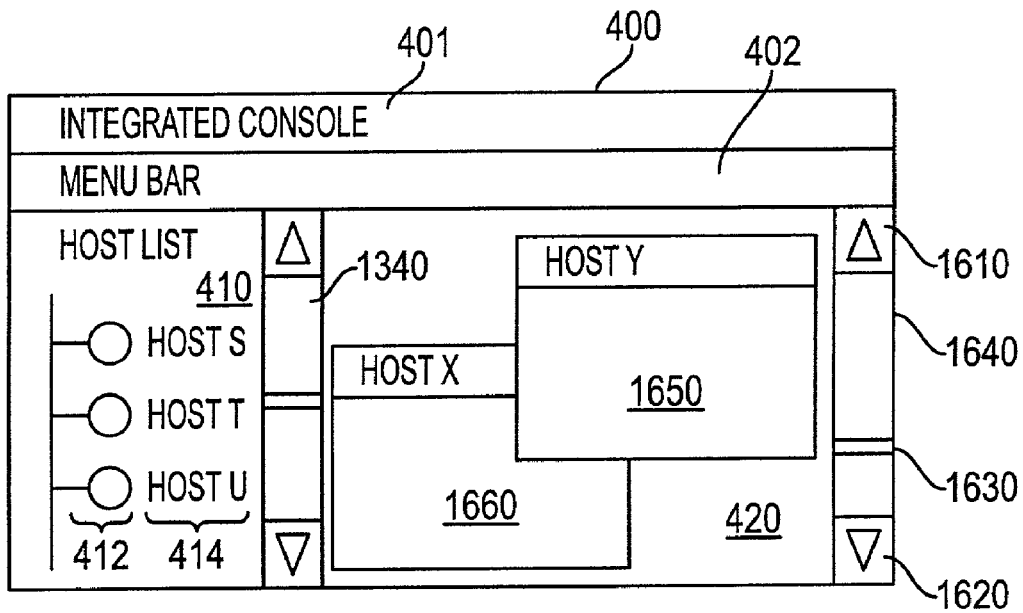
FIG. 16 illustrates an example of a GUI in accordance with embodiments of the present invention.
Figure 16B:
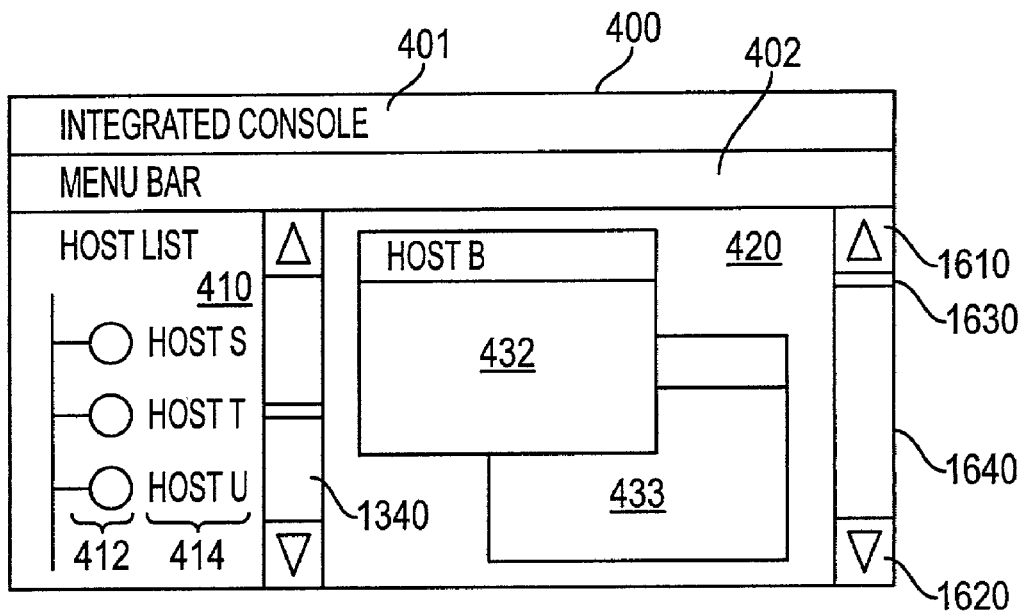

FIGS. 16A and 16B illustrate a fifth example of a GUI in accordance with the present invention. FIG. 16A shows the integrated console 400 before a message has been received from host B. At this time, the integrated console 400 displays the host X console 1660 and host Y console 1650. In this way, the user can work with only the necessary consoles displayed when there are a large number of consoles to be displayed. The user can change the consoles displayed in the region 420 by dragging an indicator 1630 up and down on a scroll bar 1640 that is adjacent to the region 420.

FIG. 16B illustrates the status of the integrated console 400 after a message has been received from host B. The integrated console 400 provides control to display the host B console 432 in region 420 when a message is received from host B. The indicator 1630 also moves to a corresponding position on the scroll bar 1640 when a message is received from host B. Therefore, even if the user is performing operations on one console, if a message is received on another console, the user is immediately informed of the received message.

Figure 17A:
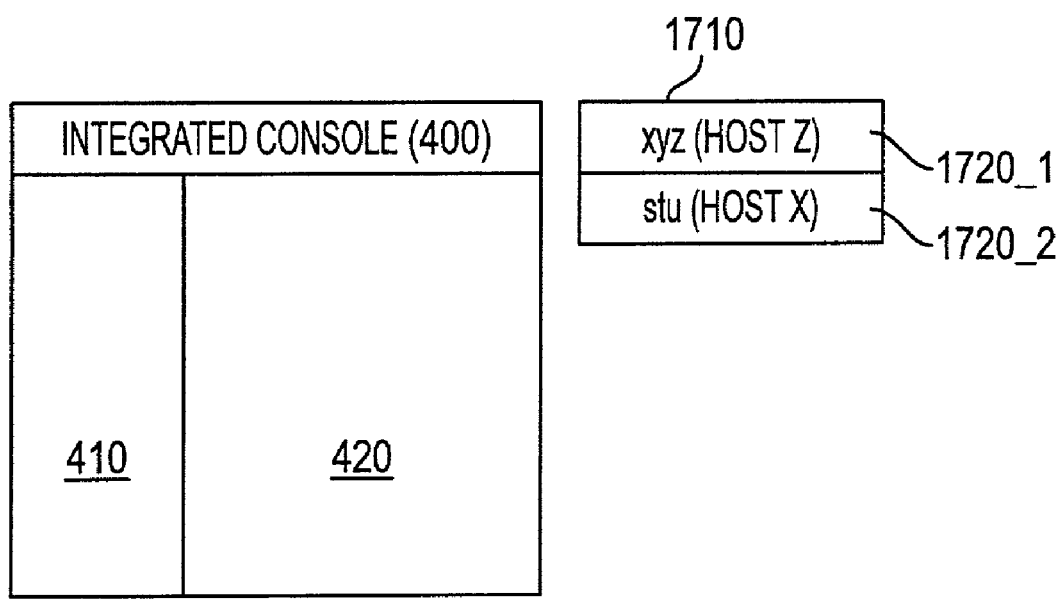
FIGS. 17A and 17B illustrate an example of a GUI in accordance with embodiments of the present invention.
Figure 17B:
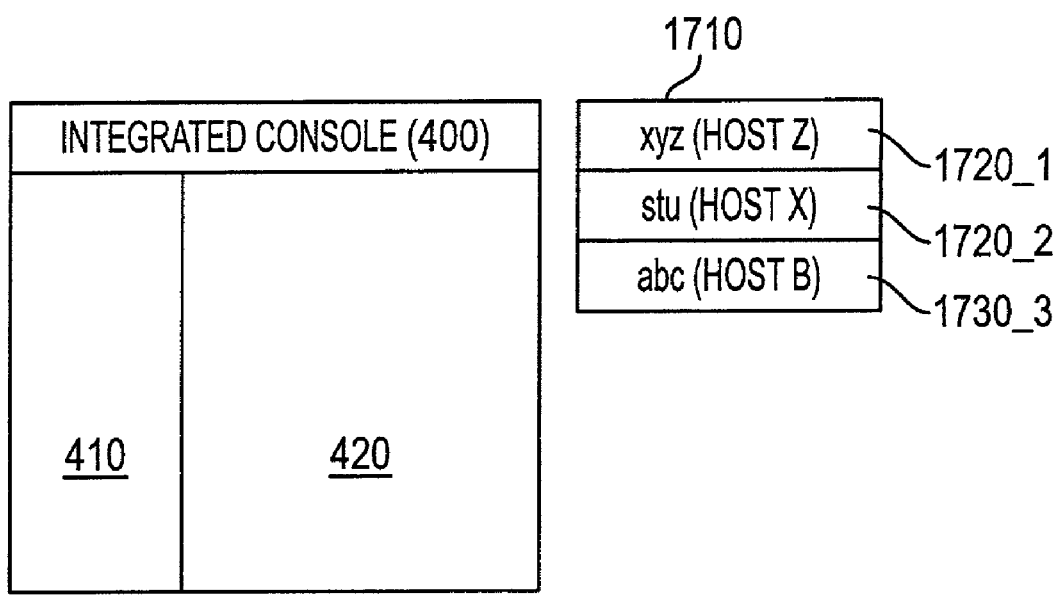

FIGS. 17A and 17B illustrate a sixth example of a GUI in accordance with embodiments of the present invention. In the example shown in FIG. 17, the integrated console 400 generates a new interface, for example, a menu or an icon, in order to access the host console from which a message is received.

FIG. 17A illustrates the status of the integrated console 400 before a message is received from host B. The interface that is generated is the access menu 1710. The access menu 1710 comprises various menu items 1720_i (where i=1, 2, 3 . . . ). In the example shown in FIG. 17, the various items 1720_i comprise the name of a host from which the message was received, and the contents of the message. By selecting the respective item 1720_i, the user can display the corresponding console in region 420 of the integrated console 400.

FIG. 17B shows the status of the integrated console 400 after a message has been received from host B. The difference between FIGS. 17A and 17B is that the corresponding item 1720_3 has been added to the access menu 1710.

The integrated operation of the console 400 shown in FIGS. 17A and 17B will be described below with reference to FIG. 20. FIG. 20 illustrates a data structure 2010 in the access menu 1710 of FIG. 17B. The data structure 2010 comprises a console window identifier 2020 and message contents 2030 displayed in region 420. The parameter hWnd (16-bit data) used in the MS Windows system is used as the window identifier ("Windows" is a registered trademark of the Microsoft Corporation).

When a message is received from the host, the integrated console 400, if it has already created the access menu 1710, obtains the hWnd of the corresponding host from the message, and adds the corresponding data to the data structure shown in FIG. 20. In this manner, the integrated console 400 adds the corresponding items to the applicable menus in the sequence in which the messages are received. The integrated console 400 displays the access menu 1710 based on the appropriate data structure, as shown in FIG. 17B.

The individual items are displayed in the access menu 1710 in a manner in which they are identifiable, and it is adequate if the corresponding console is structured to provide notification to the integrated console. Therefore, as long as the data shown in FIG. 20 includes at least the parameter hWnd, the message contents themselves can also be deleted.

It is also possible for the integrated console 400 to sort the various items in the access menu 1710 according to their importance based on importance levels. Furthermore, when multiple messages are received from a single console, the integrated console 400 can combine these items into a single item, rather than generating an item for each message.

Although not shown in the drawings, the integrated console 400 can expand the display of the consoles that have received messages, doing so in region 420. The integrated console 400 may also change all or part of the colors of a console that has received a message in order to make it identifiable from the other consoles. Furthermore, although the integrated console 400 was explained as an Multi Document Interface (MDI) in the examples above, it can also be a Single Document Interface (SDI).

The GUIs shown in FIGS. 12–17 can be broadly classified into three types: (1) control of the host list 410 (for example, FIGS. 12 and 13); (2) control of the console region 420 (for example, FIGS. 14, 15, and 16); and (3) generation of new operating interfaces (for example, FIG. 17).

The type (1) and (3) GUIs are particularly useful for those users that have many occasions to input commands into the consoles. The type (1) and (3) GUIs are GUIs wherein the console position does not change when commands are input into the console, and thus the user will not be inconvenienced during command entry.

In contrast, the type (2) GUI is particularly useful to the user who inputs commands into the consoles on rare occasions (i.e., to a user for whom most of the consoles are set to r privilege). The type (2) GUI provides displays that can be readily seen in the console window so that the user can immediately know the contents of the console messages without performing any operations.

Figure 18:
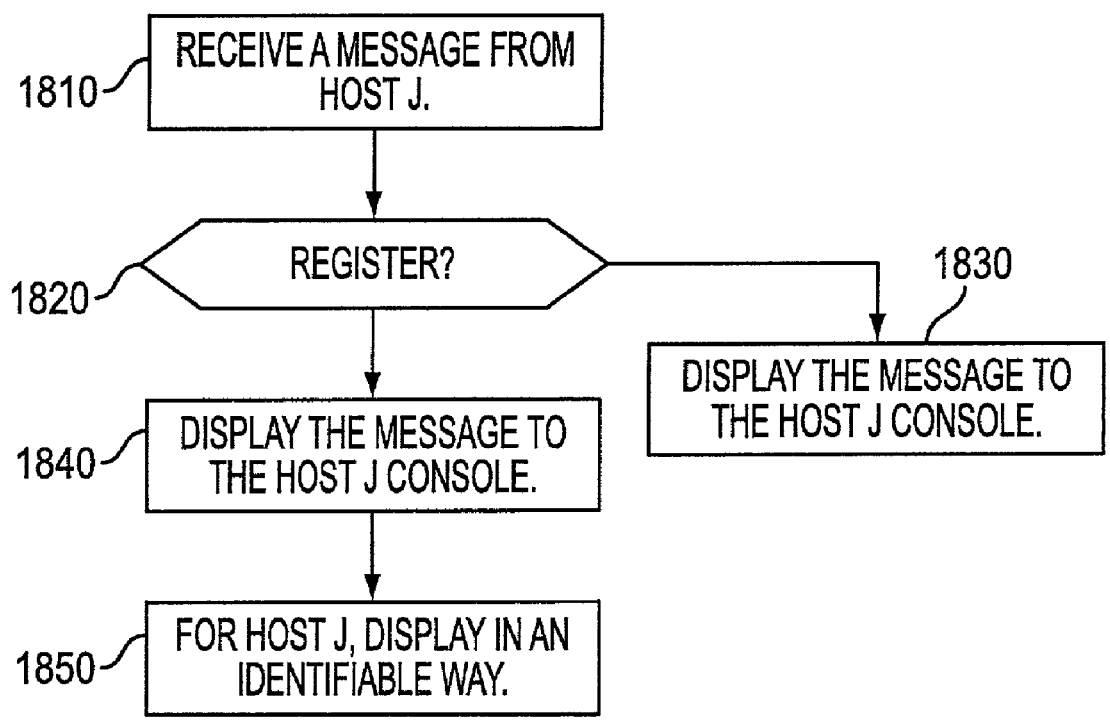
FIG. 18 is a flow chart illustrating an operational process for creating the GUIs in accordance with embodiments of the present invention.

FIG. 18 is a flowchart of an operational process performed by the integrated console 400 for providing the GUI described above. FIG. 19 illustrates a table to control the messages that are recorded by the individual hosts. The table records those messages the user wishes to monitor, selected from the messages notified from the host. Examples of messages which the user might wish to monitor are those messages that require some type of operation from the console, such as error messages.

Initially, in operation 1810, the integrated console 400 receives a message from host J. Next, in operation 1820, the integrated console 400 determines whether the message is registered in the table (FIG. 19) for host J. The integrated console 400 proceeds to operation 1840 if the message is not registered, and proceeds to operation 1830 if the message is registered.

In operation 1830, the integrated console 400 displays the message to the host J console. In operation 1840, the integrated console 400 displays the message to the host J console.

In operation 1850, the integrated console 400 display displays information for host J in an identifiable manner. For example, the integrated console 400 provides a display such as shown in FIG. 12 through FIG. 17.

Figure 21:
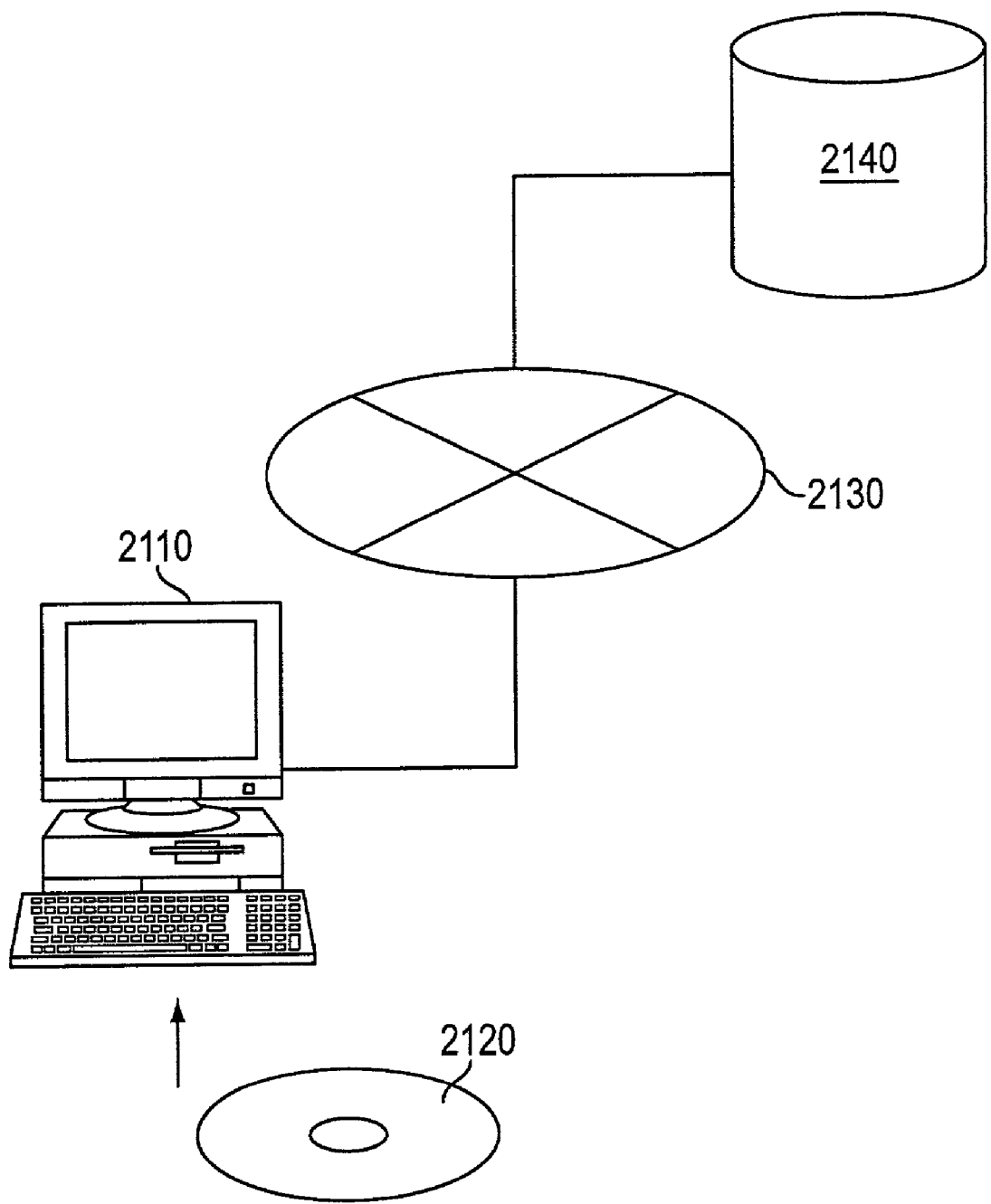
FIG. 21 illustrates the various distribution methods in accordance with embodiments of the present invention.

FIG. 21 is a diagram explaining a method of distributing the software program(s) used to implement the present invention with a computer. The program code of the software of the present invention, including both the source code and the object code, is stored on a recording medium 2120. The recording medium 2120 may be a CD-ROM, MO, floppy diskette, hard disk, or the like. The program code that is stored on the recording medium 2120 is installed into a computer 2110 and run, at which time the program code is loaded into the memory of the computer 2110 and executed by the computer's CPU.

In accordance with the present invention, the software can also be stored on a hard disk device 2140 of an Internet provider server. In this case, the user is able to download the software to the hard drive of computer 2110 through a network 2130. After restarting, the situation would be the same as described above, and therefore a detailed description will not be provided here.

The present invention makes it possible to control a single server computer from a plurality of client computers.

In addition, the present invention provides an improved GUI for displaying console information when multiple server computer consoles are controlled as a group on a single client computer. Console information refers to either the various console windows, for example, 431 through 433 shown in FIG. 4, or to a list of hosts, for example, icon 412 or host name 414 in FIG. 4 or both.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An input/output control system for controlling the input and output of commands from a plurality of consoles to a server, comprising:
   an input/output status controller, based on control tables, controlling an input/output status of commands from respective consoles to the server so that only one console at a time is allowed to have input privilege and other of the consoles are allowed to have output privileges;
   an input/output controller, based on privilege control tables, controlling input/output of commands based on the input/output status so that the commands from an input privileged consoles are sent to the server, and response messages or results of execution from the server are sent to the input privileged console and output privileged consoles; and
   a switching mechanism, after receiving the results of execution, automatically switching the input privileged console to having the output privilege.

2. An input/output control system as recited in claim 1, further comprising:
   a display displaying console information identifying whether respective consoles have input/output privileges based on whether command input privileges are set for respective consoles.

3. An input/output control system as recited in claim 1, wherein the input/output controller sets a type of input/output control based on the input/output status of a command received from the respective consoles.

4. A computer readable storage medium storing a program for implementing with a computer a method of controlling command input/output from a plurality of consoles to a server, the method comprising:
   receiving commands input from the plurality of consoles;
   updating an input status of the server in response to a first command received from a first console;
   controlling, based on control tables, the input status of the server to exclude input of other commands to the server while in the updated input status,
   wherein only one console at a time is allowed to have input privilege and other of the consoles are allowed to have output privilege with the server;
   controlling, based on privilege control tables, input/output of commands based on an input/output status so that the commands from an input privileged console are sent to the server, and response messages or results of execution from the server are sent to the input privileged console and output privileged consoles; and
   automatically switching, after receiving the results of execution at a switching mechanism, the input privileged console to having the output privilege.

5. A method of controlling command input/output from a plurality of consoles to a server, the method comprising:
   receiving commands input from the plurality of consoles;
   updating an input status of the server in response to a first command received from a first console;
   controlling, based on control tables, the input status of the server to exclude input of other commands to the server while in the updated input status,
   wherein only one of the plurality of consoles at a time is allowed to have input privilege and other of the consoles are allowed to have output privilege with the server;
   controlling, based on privilege control tables, input/output of commands based on an input/output status so that the commands from an input privileged console are sent to the server, and response messages or results of execution from the server are sent to the input privileged console and output privileged consoles; and
   automatically switching, after receiving the results of execution at a switching mechanism, the input privileged console to having the output privilege.

* * * * *